(12) United States Patent
Hu (10) Patent No.: US 9,778,107 B2
(45) Date of Patent: Oct. 3, 2017

(54) LINEAR FREQUENCY DOMAIN GRATING AND MULTIBAND SPECTROMETER HAVING SAME

(71) Applicant: Zhilin Hu, Lilburn, GA (US)

(72) Inventor: Zhilin Hu, Lilburn, GA (US)

(73) Assignee: Zhilin Hu, Lilburn, GA (US)

( * ) Notice: Subject to any disclaimer, the term of this patent is extended or adjusted under 35 U.S.C. 154(b) by 12 days.

(21) Appl. No.: 15/075,187

(22) Filed: Mar. 20, 2016

(65) Prior Publication Data

US 2016/0282180 A1  Sep. 29, 2016

(30) Foreign Application Priority Data

Mar. 23, 2015 (CN) ........................... 2015 1 0126357
Mar. 23, 2015 (CN) ........................... 2015 1 0126633
Mar. 23, 2015 (CN) ........................... 2015 2 0164511
Jul. 19, 2015 (CN) ........................... 2015 1 0424703

(51) Int. Cl.
| | |
|---|---|
| *G01J 3/28* | (2006.01) |
| *G01J 3/18* | (2006.01) |
| *G02B 5/18* | (2006.01) |
| *G02B 1/14* | (2015.01) |
| *G02B 5/04* | (2006.01) |
| *G01J 3/14* | (2006.01) |
| *G01J 3/02* | (2006.01) |
| *G01J 3/12* | (2006.01) |

(52) U.S. Cl.
CPC .............. *G01J 3/18* (2013.01); *G01J 3/0208* (2013.01); *G01J 3/0218* (2013.01); *G01J 3/14* (2013.01); *G01J 3/28* (2013.01); *G02B 1/14* (2015.01); *G02B 5/04* (2013.01); *G02B 5/1814* (2013.01); *G01J 2003/1208* (2013.01)

(58) Field of Classification Search
CPC ........ G01J 3/18; G01J 3/28; G01J 3/14; G01J 3/45; G01J 3/02; G01J 3/0218; G01J 3/0208; G01J 2003/1208; G02B 1/14; G02B 5/18; G02B 5/1814; G02B 5/04
See application file for complete search history.

(56) References Cited

U.S. PATENT DOCUMENTS

2012/0242988 A1* 9/2012 Saxer ................... A61B 3/1005
356/328
2016/0341951 A1* 11/2016 Tearney ............. A61B 1/00096

* cited by examiner

Primary Examiner — Jamil Ahmed
(74) Attorney, Agent, or Firm — Zhilin Hu (57) ABSTRACT

A linear frequency domain grating and a multiband spectrometer having the same. The linear frequency domain grating includes a dispersive optical element and a diffractive optical element being substantially in contact with the dispersive optical element or being substantially integrated with the dispersive optical element, configured to receive a beam of incident light along an incident optical path, and diffract and disperse it into its constituent spectrum of frequencies of the light that is output from the dispersive optical element along an output optical path, such that the output light has a spatial distribution on a focal plane in the output optical path that is a linear function of the frequency. The linear frequency domain grating is a transmissive-type grating or a reflective-type grating, depending on whether the incident optical path and the output optical path are in different sides or the same side of the diffractive optical element.

17 Claims, 5 Drawing Sheets

LINEAR FREQUENCY DOMAIN GRATING AND MULTIBAND SPECTROMETER HAVING SAME

CROSS-REFERENCE TO RELATED PATENT APPLICATIONS

This application claims priority to and the benefit of Chinese Patent Application Nos. CN201510126633.1, CN201510126357.9, and CN201520164511.7, all filed Mar. 23, 2015, and Chinese Patent Application No. CN201510424703.1, filed Jul. 19, 2015, which are incorporated herein in their entireties by reference.

FIELD

This invention relates generally to optical devices, and especially relates to a linear frequency domain grating and a multiband spectrometer having the same.

BACKGROUND

For existing diffraction gratings or prisms, dispersion of light output by the existing diffraction gratings or prisms is linear with respect to the wavelength, which means that the output angles of light output from the existing diffraction gratings or prisms are linear with respect to the wavelength of the incident light, since the output angles of light output from the existing diffraction gratings or prisms are dependent from the wavelengths of incident light. Therefore, spectroscopy made of traditional diffraction grating and prism can only be linear in wavelength, where the output angles of output light are nonlinear with respect to the frequency of the incident light, In the field of optical coherent imaging, such as Optical Coherence Tomography (OCT), the general practice is to get the image by Fourier transform of acquired coherent spectrum. Since the acquired coherent spectrum is linear with respect to wavelength, it must be transformed from the wavelength domain to the frequency domain by the method of interpolation prior to the Fourier transform. Accordingly, the imaging speed is reduced. In addition, due to the non-linear effects in the frequency domain, the density of optical images is lighter and the noise of imaging is greater.

The traditional spectrometers are only applicable to light with certain wavelengths, if the wavelength of incident light is changed, it is required to change to a corresponding spectrometer, thereby limiting applications of the spectrometer.

Therefore, there exist needs in many situations for optical devices in which the dispersion of light is linear with respect to the frequency of incident light.

SUMMARY

One of the objectives of the invention is to provide an optical device that is capable of linearly dispersing light in the frequency domain.

In one aspect of the invention, a linear frequency domain grating comprises a dispersive optical element and a diffractive optical element being substantially in contact with the dispersive optical element or being substantially integrated with the dispersive optical element, configured to receive a beam of incident light along an incident optical path, and diffract and disperse it into its constituent spectrum of frequencies of the light that is output from the dispersive optical element along an output optical path, such that the output light has a spatial distribution on a focal plane in the output optical path that is a linear function of the frequency.

In some embodiments, the diffractive optical element is characterized with grooves per unit $\mu$; the dispersive optical element is characterized with a refractive index $n(\lambda)$ a geometry and a size; and the grooves per unit $\mu$ of the diffractive optical element, and the refractive index $n(\lambda)$, the geometry and the size of the dispersive optical element are selected such that the spatial distribution of the output light on the focal plane in the output optical path is a linear function of the wave number $k=2\pi/\lambda$, $\lambda$ being a wavelength of the incident light.

In some embodiments, the linear frequency domain grating further comprises a protective optical element formed on the diffractive optical element such that the diffractive optical element is positioned between the protective optical element and the dispersive optical element.

In some embodiments, the linear frequency domain grating a transmissive-type grating when the incident optical path and the output optical path are in different sides of the diffractive optical element, or a reflective-type grating when the incident optical path and the output optical path are in the same side of the diffractive optical element.

In some embodiments, the diffractive optical element comprises a grating.

In some embodiments, the dispersive optical element is formed of an optically transparent material.

In some embodiments, the dispersive optical element comprises a prism.

In some embodiments, the prism is a glass prism with a base angle $\alpha$. The differential $\delta\theta_4$ of an output angle $\theta_4$ of the output light with respect to a wave number $k=2\pi/\lambda$, $\lambda$ being a wavelength of the incident light, satisfies with the relationship of:

$$\delta\theta_4 = \left\{ \frac{kX}{4\pi^2\sqrt{n(\lambda)^2 - \sin\theta_3^2}} + \frac{2\pi\mu Z\cos\theta_3}{Uk^2} + \frac{kXZ\cos\theta_3\cos\alpha}{4\pi^2 Y\sqrt{1-n(\lambda)^2\cos\alpha^2}} \right\}$$

$$\frac{1}{V} \cdot \delta k$$

$$= \theta_4'(k) \cdot \delta k,$$

wherein $\theta_4'$ (k) is the derivative of the output angle $\theta_4$ with respect to the wave number k of the incident light, wherein $\theta_3$ is a diffracted angle of the incident light after it is diffracted by the diffractive optical element, and wherein $n(\lambda)$ is a refractive index of the prism, and wherein $$\theta_3 = \sin^{-1}(\mu\lambda - \mu\lambda_c/2) - \sin^{-1}(\mu\lambda_c/2) + \sin^{-1}(n(\lambda)\cos\alpha)$$

$$n(\lambda) = \sqrt{1 + \lambda^2\left(\frac{K_1}{\lambda^2-L_1} + \frac{K_2}{\lambda^2-L_2} + \frac{K_3}{\lambda^2-L_3}\right)},$$

$$U = \sqrt{1 - 4\pi^2\mu^2\left(\frac{1}{k} - \frac{1}{2k_c}\right)^2},$$

$$V = \sqrt{\frac{1}{\sin(2\alpha)^2} - \left[\sqrt{n(\lambda)^2 - \sin\theta_3^2} + \sin\theta_3\cot(2\alpha)\right]^2},$$

$$X = \frac{K_1 L_1}{\left(1-\frac{L_1}{4\pi^2}k^2\right)^2} + \frac{K_2 L_2}{\left(1-\frac{L_2}{4\pi^2}k^2\right)^2} + \frac{K_3 L_3}{\left(1-\frac{L_3}{4\pi^2}k^2\right)^2},$$

$$Y = \sqrt{1 + \frac{K_1}{1-\frac{L_1}{4\pi^2}k^2} + \frac{K_2}{1-\frac{L_2}{4\pi^2}k^2} + \frac{K_3}{1-\frac{L_3}{4\pi^2}k^2}}, \text{ and}$$

-continued $$Z = \cot 2\alpha - \frac{\sin\theta_3}{\sqrt{n(\lambda)^2 - \sin^2\theta_3}},$$

wherein $\lambda_c$ is a central wavelength of the incident light, and $k_c=2\pi/\lambda_c$ is the corresponding wave number to the central wavelength of the incident light, wherein μ is grooves per unit of the diffractive optical element, and wherein $K_1$, $K_2$, $K_3$, $L_1$, $L_2$, $L_3$ are material parameters of the prism.

In some embodiments, the grooves per unit μ of the diffractive optical element, the base angle α and the material parameters $K_1$, $K_2$, $K_3$, $L_1$, $L_2$, $L_3$ of the prism are selected such that the derivative $\theta_4'(k)$, when projected onto the focal plane in the output optical path, is a constant.

In another aspect of the invention, a multiband spectrometer comprises at least one linear frequency domain grating as disclosed above.

In yet another aspect of the invention, a multiband spectrometer comprises a single mode fiber, a collimating unit, a grating, a focusing unit, and a camera array optically coupled to one another. The collimation unit is rotatable.

In operation, a beam of incident light is delivered by the single mode fiber to the collimating unit that collimates the delivered incident light into parallel light; the collimated parallel light is incident on the grating at a preset angle and output from the grating in a spectrum of light to the focusing unit that focuses the spectrum of light on the camera array that is positioned on a focal plane; and the camera array acquires the spectrum of light in real time.

In some embodiments, the camera array is a linear camera array.

In some embodiments, the multiband spectrometer further comprises at least one of a first reflective mirror and a second reflective mirror.

In some embodiments, the first reflective mirror is positioned between the grating and the focusing unit such that the spectrum of light output from the grating is reflected by the first reflective mirror to the focusing unit.

In some embodiments, the second reflective mirror is positioned such that the spectrum of light focused by the focusing unit is reflected by the second reflective mirror to the camera array.

In some embodiments, the grating is a linear frequency domain grating that is the same as that disclosed above.

This multiband spectrometer f this invention is applicable to incident light with different central wavelengths; combining with the linear frequency domain grating of this invention, it will become a linear frequency domain spectrometer. In coherent optical imaging, it is unnecessary to change frequency domain space of spectrum acquired via linear frequency domain spectrometer by the method of interpolation. Therefore, the speed of coherent optical imaging is increased greatly, in addition, this linear frequency domain spectrometer eliminates the effects of non-linear frequency domain, which improves the density of coherent optical imaging and reduces the noise of imaging, These and other aspects of the present invention will become apparent from the following description of the preferred embodiment taken in conjunction with the following drawings, although variations and modifications therein may be effected without departing from the spirit and scope of the novel concepts of the invention,

BRIEF DESCRIPTION OF DRAWINGS

The accompanying drawings, which are incorporated in and constitute apart of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

The description will be made as to the embodiments of the present invention in conjunction with the accompanying drawings.

Figure 1:
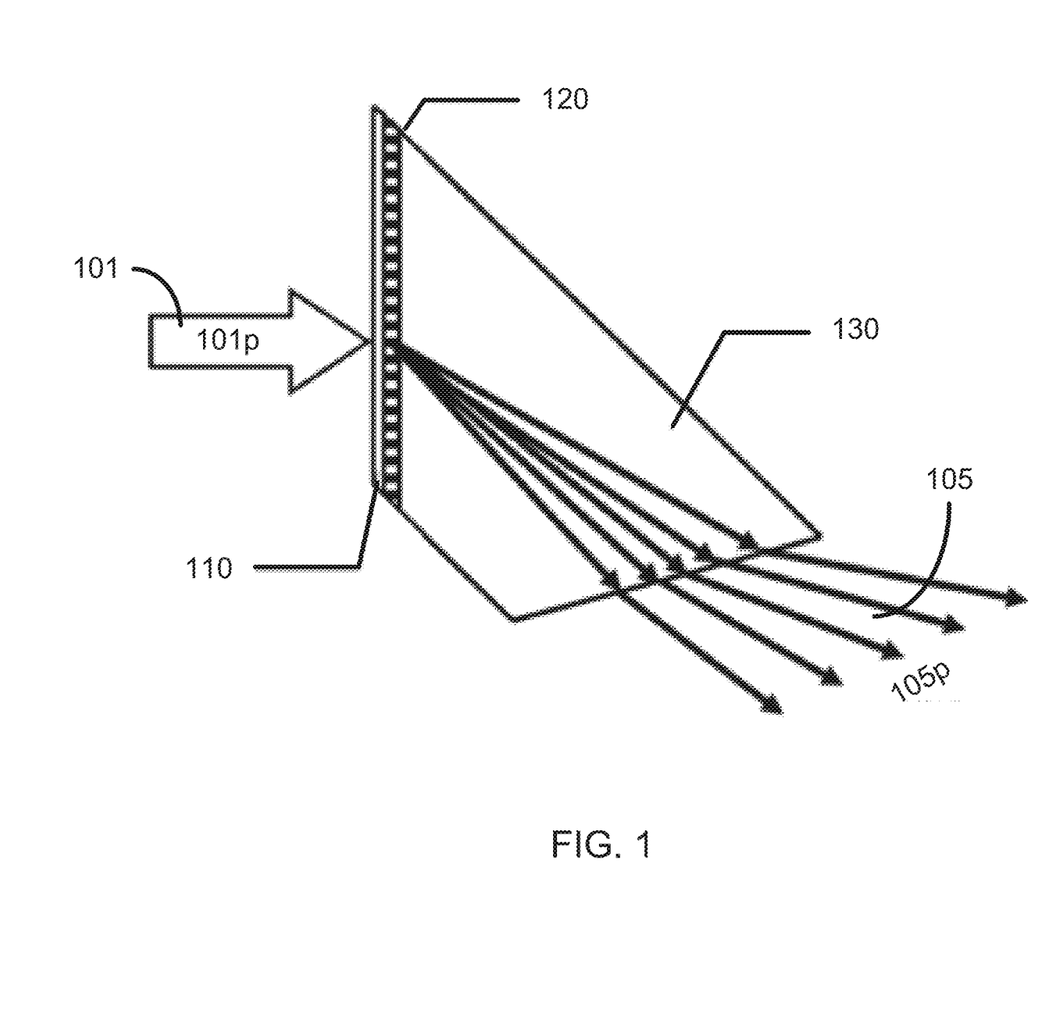
FIG. 1 shows schematically a linear frequency domain grating according to one embodiment of the invention.
Figure 2:
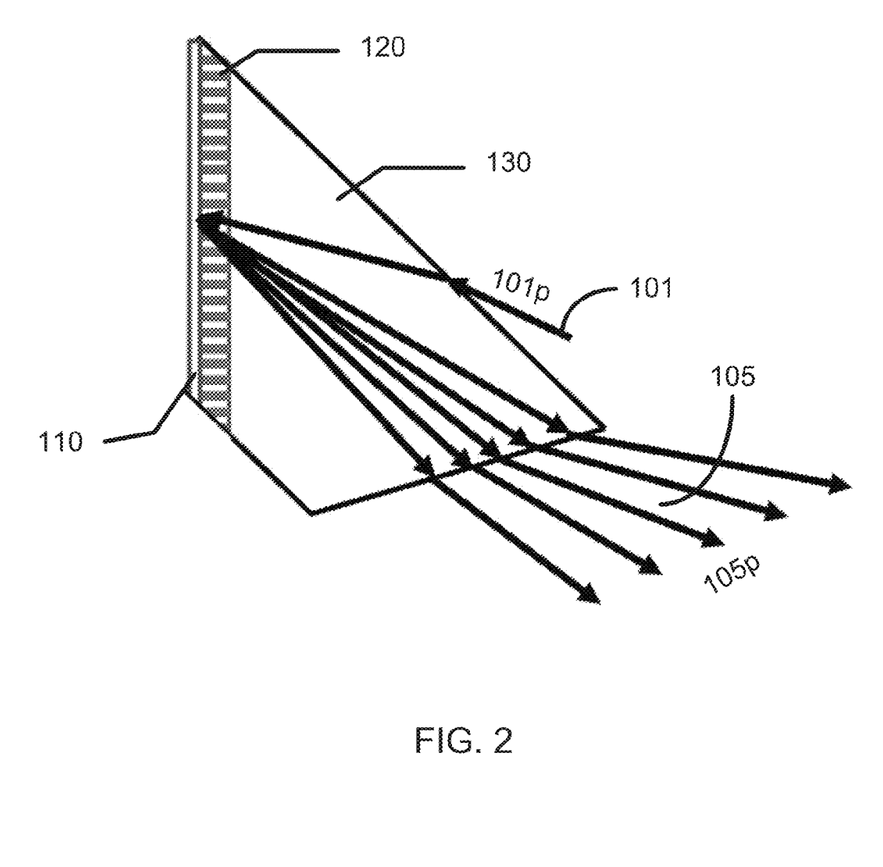
FIG. 2 shows schematically a linear frequency domain grating according to another embodiment of the invention.
Figure 3:
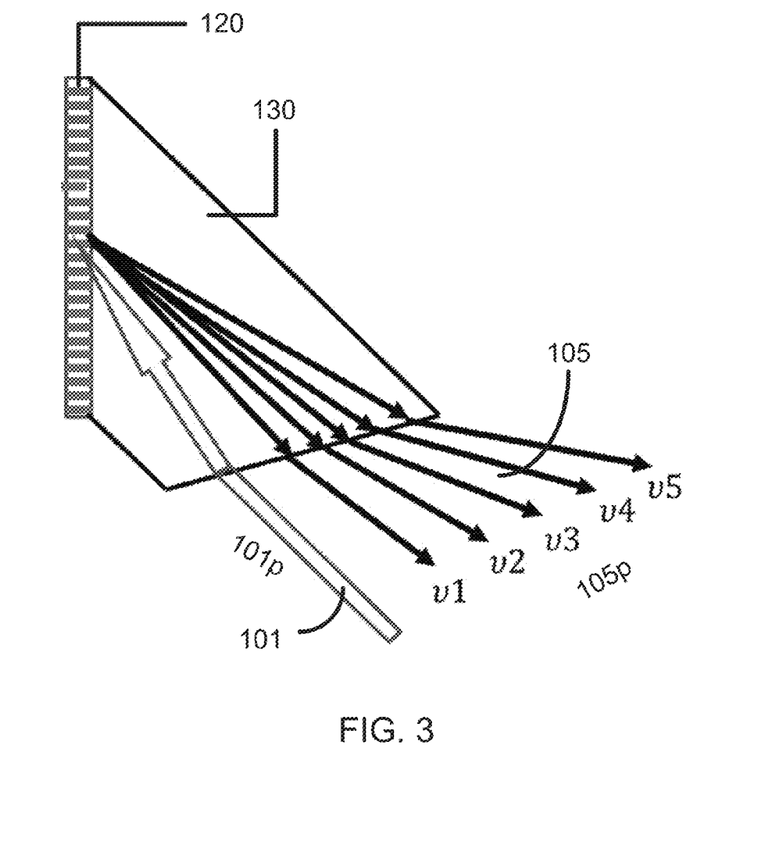
FIG. 3 shows schematically a linear frequency domain grating according to a further embodiment of the invention.

FIGS. 1-3 show schematically a linear frequency domain grating according three exemplary embodiments of the invention, respectively. In these exemplary embodiments, the linear frequency domain grating comprises a dispersive optical element 130 and a diffractive optical element 120. The diffractive optical element 120 is substantially in contact with the dispersive optical element 130 or substantially integrated with the diffractive optical element 120. The dispersive optical element 130 and the diffractive optical element 120 are configured to receive a beam of incident light 101 along an incident optical path 101$p$, and diffract and disperse it into its constituent spectrum of frequencies of the light 105 that is output from the dispersive optical element 130 along an output optical path 105$p$, such that the output light 105 has a spatial distribution on a focal plane in the output optical path 105$p$ that is a linear function of the frequency.

In some embodiments, as shown in FIGS. 1 and 2, the linear frequency domain grating further includes a protective optical element 110 formed on the diffractive optical element 120 such that the diffractive optical element 120 is positioned between the protective optical element 110 and the dispersive optical element 130.

In some embodiments, the dispersive optical element 130 is formed of an optically transparent material, such as glass, polymers or the likes. In some embodiments, the dispersive optical element 130 comprises a prism. The prism can be an equiangular prism, or other geometric prisms. In some embodiments, the diffractive optical element 120 can be any type of diffraction gratings. The diffraction gratings can be fabricated either classically with the use of a ruling engine by burnishing grooves with a diamond stylus, or holographically with the use of interference fringes generated at the intersection of two laser beams, or other fabricating methods.

In one embodiment, the diffractive optical element 120 is characterized with grooves per unit and the dispersive optical element 130 is characterized with a refractive index $n(\lambda)$ a geometry and a size. According to the invention, the grooves per unit $\mu$ of the diffractive optical element, and the refractive index $n(\lambda)$, the geometry and the size of the dispersive optical element are selected such that the spatial distribution of the output light on the focal plane in the output optical path is a linear function of the wave number $k=2\pi/\lambda$, $\lambda$ being a wavelength of the incident light.

According to embodiments of the invention, as shown in FIGS. 1-3, the linear frequency domain grating a transmissive-type grating when the incident optical path 101$p$ and the output optical path 105$p$ are in different sides of the diffractive optical element 120 (FIG. 1), or a reflective-type grating when the incident optical path 101$p$ and the output optical path 101$p$ are in the same side of the diffractive optical element 120 (FIGS. 2 and 3).

Without intent to limit the scope of the invention, exemplary methods and their related results according to the embodiments of the invention are given below. Moreover, certain theories are proposed and disclosed herein; however, in no way they, whether they are right or wrong, should limit the scope of the invention.

For the transmissive-type, linear frequency domain grating, as shown in FIG. 1, when the incident light 101 is incident on the protective optical layer 110 with a refractive index $n_2$ from a first medium (e.g., air) with a refractive index $n_1$, the incident angle $\theta_1$ of the incident light 101 and the refraction angle $\theta_2$ of the incident light refracted in the protective optical layer 110 at the interface between the air and the protective optical layer 110 satisfies with Snell's law:

$$n_1 \sin \theta_1 = n_2 \sin \theta_2 \tag{1}$$

The refracted light then enters into the diffractive optical element 120 at the angle $\theta_2$, accordingly, it satisfies with the grating equation:

$$\lambda \mu m = n(\lambda)(\sin \theta_2 + \sin \theta_3) \tag{2}$$

where $\lambda$ is a wavelength of the incident light 101, $\mu$ is grooves per unit of the diffractive optical element 120, m is the diffraction order, $\theta_3$ is the diffraction angle of the light diffracted by the diffractive optical element 120 satisfying with $$\theta_3 = \sin^{-1}(\mu\lambda - \mu\lambda_c/2) - \sin^{-1}(\mu\lambda_c/2) + \sin^{-1}(n(\lambda)\cos\alpha), \tag{3}$$

where α is a base angle of the prism 130, and n(λ) is a refractive index of the prism, which depends on the optical material of which the prism is made. For a glass prism, n(λ) is in the form of $$n(\lambda) = \sqrt{1 + \lambda^2 \left( \frac{K_1}{\lambda^2 - L_1} + \frac{K_2}{\lambda^2 - L_2} + \frac{K_3}{\lambda^2 - L_3} \right)}, \quad (4)$$

where $K_1$, $K_2$, $K_3$, $L_1$, $L_2$, $L_3$ are material parameters of the prism 130. The differential $\delta\theta_3$ of the diffraction angle $\theta_3$ of the incident light with respect to a wave number $k=2\pi/\lambda$ of the incident light satisfies with $$\delta\theta_3 = -\frac{2\pi\mu\delta k}{k^2 U} + \frac{\cos\alpha \delta n}{\sqrt{1 - n(\lambda)^2 \cos\alpha^2}} \quad (5)$$

$$= -\frac{2\pi\mu\delta k}{k^2 U} + \frac{\cos\alpha n'(k)\delta k}{\sqrt{1 - n(\lambda)^2 \cos\alpha^2}}$$

$$= \left( -\frac{2\pi\mu}{k^2 U} + \frac{\cos\alpha \cdot n'(k)}{\sqrt{1 - n(\lambda)^2 \cos\alpha^2}} \right) \cdot \delta k$$

$$= \theta'_3(k) \cdot \delta k,$$

where $$U = \sqrt{1 - 4\pi^2 \mu^2 \left( \frac{1}{k} - \frac{1}{2k_c} \right)^2}, \quad (6)$$

$$\delta n = \frac{kX}{4\pi^2 Y} \cdot \delta k = n'(k) \cdot \delta k, \quad (7)$$

$$X = \frac{K_1 L_1}{\left(1 - \frac{L_1}{4\pi^2}k^2\right)^2} + \frac{K_2 L_2}{\left(1 - \frac{L_2}{4\pi^2}k^2\right)^2} + \frac{K_3 L_3}{\left(1 - \frac{L_3}{4\pi^2}k^2\right)^2}, \quad (8)$$

$$Y = \sqrt{1 + \frac{K_1}{1 - \frac{L_1}{4\pi^2}k^2} + \frac{K_2}{1 - \frac{L_2}{4\pi^2}k^2} + \frac{K_3}{1 - \frac{L_3}{4\pi^2}k^2}}, \quad (9)$$

Accordingly, an output angle $\theta_4$ of the output light output from the prism 130 satisfies with the relationship of $$\theta_4 = \sin^{-1}[\sin(2\alpha)\sqrt{n(\lambda)^2 - \sin\theta_3^2} + \sin\theta_3 \cos(2\alpha)] \quad (10)$$

The differential $\delta\theta_4$ of the output angle $\theta_4$ of the output light with respect to the wave number $k=2\pi/\lambda$ of the incident light satisfies with the relationship of:

$$\delta\theta_4 = \left\{ \frac{kX}{4\pi^2 \sqrt{n(\lambda)^2 - \sin\theta_3^2}} + \frac{2\pi\mu Z \cos\theta_3}{Uk^2} + \frac{kXZ\cos\theta_3\cos\alpha}{4\pi^2 Y\sqrt{1 - n(\lambda)^2\cos\alpha^2}} \right\} \quad (11)$$

$$\frac{1}{V} \cdot \delta k$$

$$= \theta'_4(k) \cdot \delta k,$$

where $\theta'_4(k)$ is the derivative of the output angle $\theta_4$ with respect to the wave number k of the incident light, and satisfies with $$\theta'_4(k) = \quad (12)$$

$$\left\{ \frac{kX}{4\pi^2\sqrt{n(\lambda)^2 - \sin\theta_3^2}} + \frac{2\pi\mu Z\cos\theta_3}{Uk^2} + \frac{kXZ\cos\theta_3\cos\alpha}{4\pi^2 Y\sqrt{1 - n(\lambda)^2\cos\alpha^2}} \right\} \frac{1}{V},$$

and where V and Z are respectively in the relationships of $$V = \sqrt{\frac{1}{\sin(2\alpha)^2} - \left[ \sqrt{n(\lambda)^2 - \sin\theta_3^2} + \sin\theta_3 \cot(2\alpha) \right]^2}, \quad (13)$$

$$Z = \cot 2\alpha - \frac{\sin\theta_3}{\sqrt{n(\lambda)^2 - \sin\theta_3^2}}, \quad (14)$$

where $\lambda_c$ is a central wavelength of the incident light 101, and $k_c = 2\pi/\lambda_c$ is the corresponding wave number to the central wavelength of the incident light 101, μ is grooves per unit of the diffractive optical element 120, and $K_1$, $K_2$, $K_3$, $L_1$, $L_2$, $L_3$ are 2S material parameters of the prism 130.

According to embodiments of the invention, when the grooves per unit μ of the diffractive optical element 120, the base angle α and the material parameters $K_1$, $K_2$, $K_3$, $L_1$, $L_2$, $L_3$ of the prism 130 are properly selected, the derivative $\theta'_4(k)$, when projected onto the objective focal plane in the output optical path, is a constant.

For example, if the prism 130 is formed of glass of BK7, with the bottom angle of 58.96 degrees, the center wavelength of the incident light 101 is 1310 nm, and the objective focal length is properly chosen, the pixel width of each δk is from 102 μm to 99 μm within 512 pixels.

For the reflective-type, linear frequency domain grating, as shown in FIGS. 2 and 3, the incident light 101 is incident on the interface between air and the prism 130 into the prism 130, where the incident angle $\theta_1$ and the refraction angle $\theta_2$ of the light are governed by the Snell's law as shown by equation (1) above. The refraction angle $\theta_2$ of the light is an incident angle of the light incident on the diffractive optical element 120. The light is then diffracted by the diffractive optical element 120 into the prism 130 at the diffraction angle $\theta_3$, where $\theta_2$ and $\theta_3$ also satisfies with the grating equation (2) above. Accordingly, the diffraction angle $\theta_3$ is also governed by equation (3).

Similarly, an output angle $\theta_4$ of the output light output from the prism 130, and its differential $\delta\theta_4$ and its derivative $\theta'_4(k)$ with respect to the wave number $k=2\pi/\lambda$ of the incident light also satisfy with equations (10)-(112), respectively.

According, when the grooves per unlit μ of the diffractive optical element 120, the base angle α and the material parameters $K_1$, $K_2$, $K_3$, $L_1$, $L_2$, $L_3$ of the prism 130 are properly selected, the derivative $\theta'_4(k)$, when projected onto the objective focal plane in the output optical path, is a constant.

The linear frequency domain orating can be used for linear frequency spectrograph manufacture, which possesses advantages of small size, light weight, less scattered devices and short assembling and commissioning time, effectively reduces optical loss and optical noise of linear frequency spectrograph due to interface reflection and decrease its manufacturing costs as well. One of applications of the linear frequency domain grating in spectrometer leads to a linear frequency domain spectrometer. In coherent optical imaging, when acquiring image of coherent spectrum through Fourier Transform, it is unnecessary to change frequency domain space of spectrum acquired via the linear frequency domain spectrometer by the method of interpolation. Therefore, the speed of coherent optical imaging is increased greatly, in addition, this linear frequency domain spectrometer eliminates the effects of non-linear frequency domain, which improves the density of coherent optical imaging and reduces the noise of imaging.

In one aspect, the invention provides a multiband spectrometer having one or more linear frequency domain gratings as disclosed above.

Figure 4:
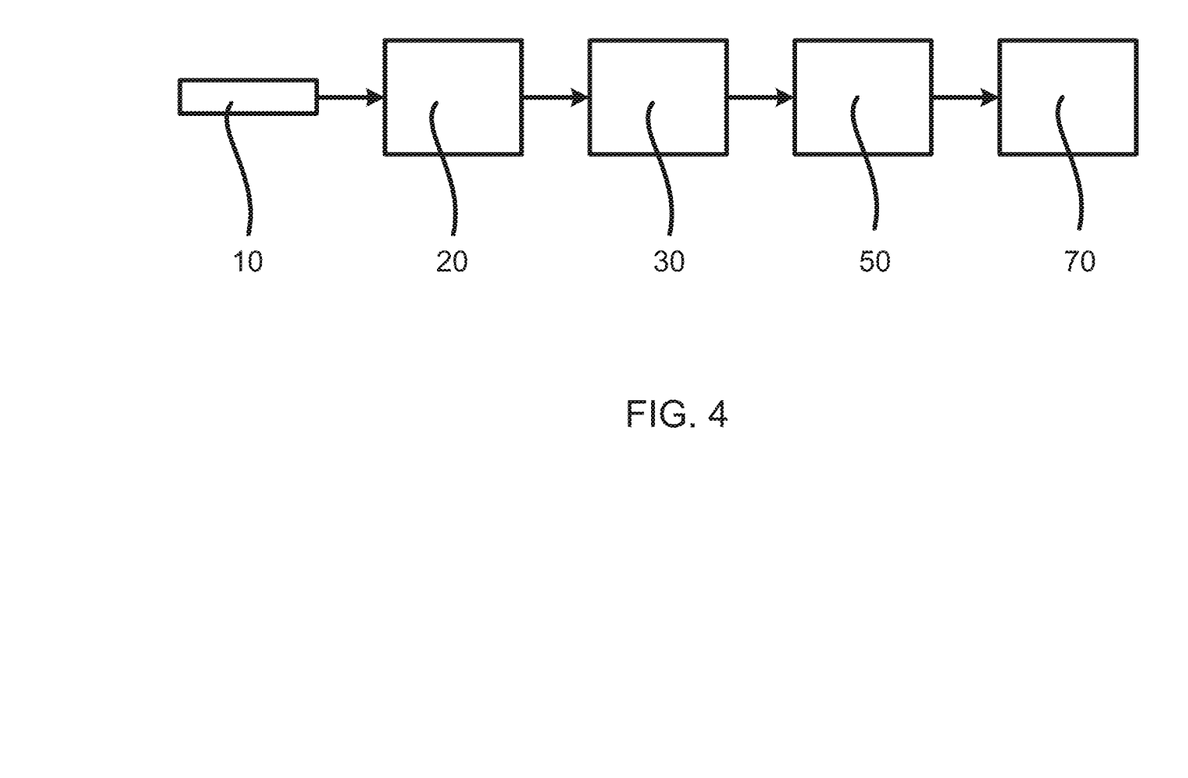
FIG. 4 shows schematically a multiband spectrometer according to one embodiment of the invention.

FIG. 4 shows schematically the multiband spectrometer according to one embodiment of the invention. In this exemplary embodiment, the multiband spectrometer includes a single mode fiber 10, a collimating unit 20, a grating 30, a focusing unit 50, and a camera array 70 optically coupled to one another. In certain embodiment, the collimation unit 20 is rotatable for collimating light, for example to change the angle of incidence, so as to make the spectrometer applicable to incident light with different central wavelengths, through corresponding adjustments, without changing the setup of the grating 30, the focusing unit 50 and the camera array 70.

In operation, a beam of incident light is delivered by the single mode fiber 10 to the collimating unit 20 that collimates the delivered incident light into parallel light. The collimated parallel light is incident on the grating 30 at a preset angle and output from the grating 30 in a spectrum of light to the focusing unit 50 that focuses the spectrum of light on the camera array 70 that is positioned on a focal plane. The camera array 70 acquires the spectrum of light in real time. The camera array can be a linear camera array.

Figure 5:
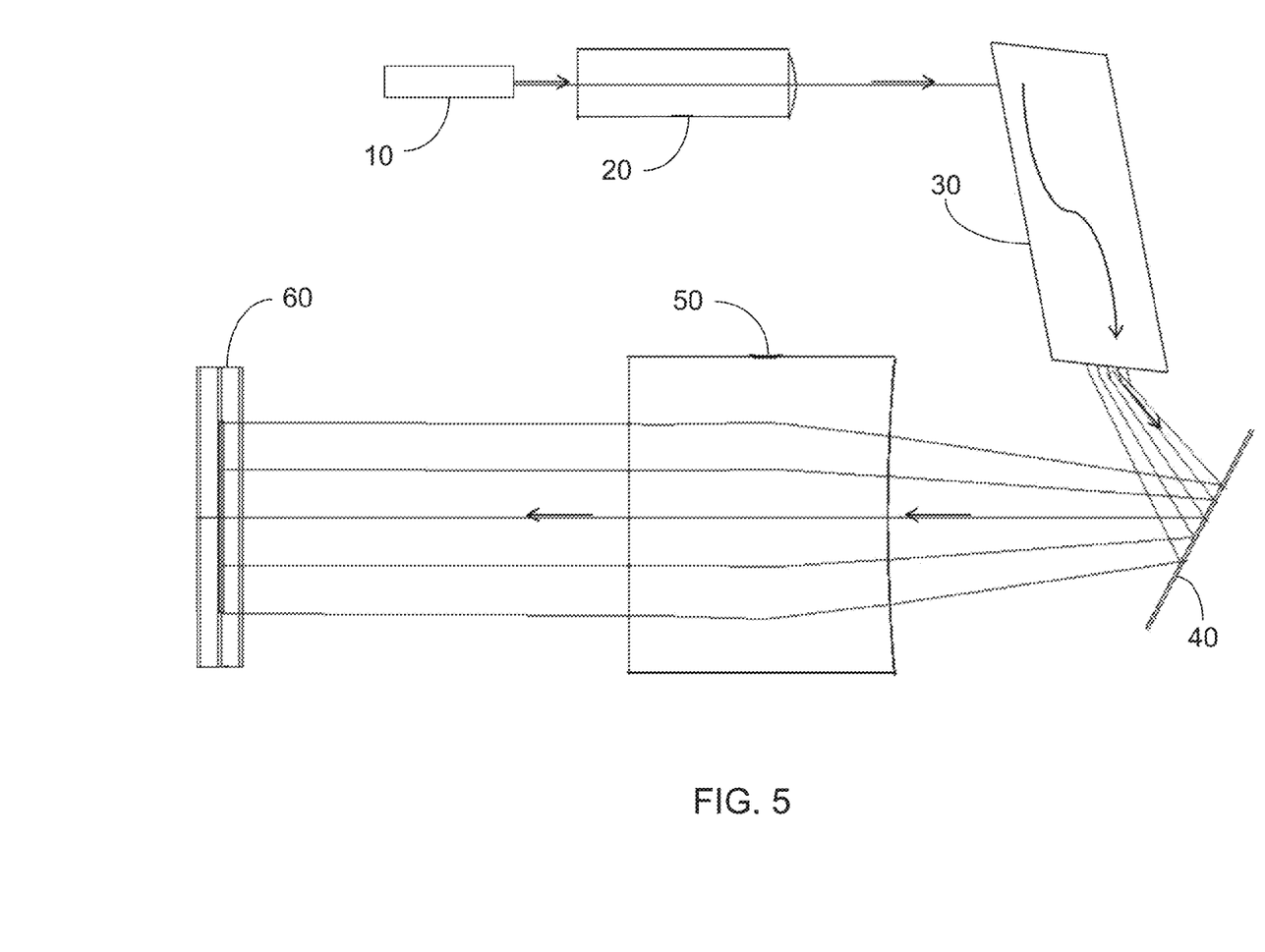
FIG. 5 shows schematically a multiband spectrometer according to another embodiment of the invention.

FIG. 5 shows schematically the multiband spectrometer according to another embodiment of the invention. In this exemplary embodiment, the multiband spectrometer includes a single mode fiber 10, a collimating unit 20, a grating 30, a focusing unit 50, first and second reflective mirrors 40 and 60, and a camera array 70 optically coupled to one another. The first reflective mirror 40 is positioned between the grating 30 and the focusing unit 50 such that the spectrum of light output from the grating 30 is reflected by the first reflective mirror 40 to the focusing unit 50. The second reflective mirror 60 is positioned such that the spectrum of light focused by the focusing unit 50 is reflected by the second reflective mirror 60 to the camera array 70.

According to the inventions, the grating 30 comprises the linear frequency domain gratings as disclosed above. Thus, properly choosing the grooves per unit μ of the diffractive optical element, and the refractive index n(λ), the geometry and the size of the dispersive optical element results in the spatial distribution of the output light on the focal plane in the output optical path is a linear function of the wave number k=2π/λ, λ being a wavelength of the incident light.

This multiband spectrometer by using the linear frequency domain grating is a linear frequency domain spectrometer and applicable to incident light with different central wavelengths. In coherent optical imaging, it is unnecessary to change frequency domain space of spectrum acquired via the linear frequency domain spectrometer by the method of interpolation. Therefore, the speed of coherent optical imaging is increased greatly, in addition, this linear frequency domain spectrometer eliminates the effects of non-linear frequency domain, which improves the density of coherent optical imaging and reduces the noise of imaging. Among other things, this invention is widely applicable to optical imaging devices, the Optical Coherence Tomography (OCT), spectrum analysis, optical communications and other aspects of modern spectroscopy.

While example systems, methods, and so on, have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A linear frequency domain grating, comprising:
   a dispersive optical element and a diffractive optical element being substantially in contact with the dispersive optical element or being substantially integrated with the dispersive optical element, configured to receive a beam of incident light along an incident optical path, and diffract and disperse it into its constituent spectrum of frequencies of the light that is output from the dispersive optical element along an output optical path, such that the output light has a spatial distribution on a focal plane in the output optical path that is a linear function of the frequency,
   wherein the dispersive optical element is formed of an optically transparent material; and
   wherein the diffractive optical element is characterized with grooves per unit μ, wherein the dispersive optical element is characterized with a refractive index n(λ) a geometry and a size; and wherein the grooves per unit μ of the diffractive optical element, and the refractive index n(λ), the geometry and the size of the dispersive optical element are selected such that the spatial distribution of the output light on the focal plane in the output optical path is a linear function of the wave number k=2π/λ, λ being a wavelength of the incident light.

2. The linear frequency domain grating of claim 1, further comprising a protective optical element formed on the diffractive optical element such that the diffractive optical element is positioned between the protective optical element and the dispersive optical element.

3. The linear frequency domain grating of claim 1, being a transmissive-type grating when the incident optical path and the output optical path are in different sides of the diffractive optical element, or being a reflective-type grating when the incident optical path and the output optical path are in the same side of the diffractive optical element.

4. The linear frequency domain grating of claim 1, wherein the diffractive optical element comprises a grating.

5. The linear frequency domain grating of claim 1, wherein the dispersive optical element comprises a prism.

6. The linear frequency domain grating of claim 5, wherein the prism is a glass prism with a base angle α, and wherein a differential $\delta\theta_4$ of an output angle $\theta_4$ of the output light with respect to a wave number k=2π/λ, λ being a wavelength of the incident light, satisfies with the relationship of:

$$\delta\theta_4 = \left\{ \frac{kX}{4\pi^2\sqrt{n(\lambda)^2 - \sin\theta_3^2}} + \frac{2\pi\mu Z\cos\theta_3}{Uk^2} + \frac{kXZ\cos\theta_3\cos\alpha}{4\pi^2 Y\sqrt{1 - n(\lambda)^2\cos\alpha^2}} \right\}$$

-continued $$\frac{1}{V} \cdot \delta k$$
$$= \theta'_4(k) \cdot \delta k,$$

wherein $\theta_4'(k)$ is the derivative of the output angle $\theta_4$ with respect to the wave number k of the incident light, wherein $\theta_3$ is a diffracted angle of the incident light after it is diffracted by the diffractive optical element, and wherein $n(\lambda)$ is a refractive index of the prism, and wherein $$\theta_3 = \sin^{-1}(\mu\lambda - \mu\lambda_c/2) - \sin^{-1}(\mu\lambda_c/2) + \sin^{-1}(n(\lambda)\cos\alpha)$$

$$n(\lambda) = \sqrt{1 + \lambda^2 \left(\frac{K_1}{\lambda^2 - L_1} + \frac{K_2}{\lambda^2 - L_2} + \frac{K_3}{\lambda^2 - L_3}\right)},$$

$$U = \sqrt{1 - 4\pi^2 \mu^2 \left(\frac{1}{k} - \frac{1}{2k_c}\right)^2},$$

$$V = \sqrt{\frac{1}{\sin(2\alpha)^2} - \left[\sqrt{n(\lambda)^2 - \sin\theta_3^2} + \sin\theta_3 \cot(2\alpha)\right]^2},$$

$$X = \frac{K_1 L_1}{\left(1 - \frac{L_1}{4\pi^2}k^2\right)^2} + \frac{K_2 L_2}{\left(1 - \frac{L_2}{4\pi^2}k^2\right)^2} + \frac{K_3 L_3}{\left(1 - \frac{L_3}{4\pi^2}k^2\right)^2},$$

$$Y = \sqrt{1 + \frac{K_1}{1 - \frac{L_1}{4\pi^2}k^2} + \frac{K_2}{1 - \frac{L_2}{4\pi^2}k^2} + \frac{K_3}{1 - \frac{L_3}{4\pi^2}k^2}}, \text{ and}$$

$$Z = \cot 2\alpha - \frac{\sin\theta_3}{\sqrt{n(\lambda)^2 - \sin\theta_3^2}},$$

wherein $\lambda_c$ is a central wavelength of the incident light, and $k_c = 2\pi/\lambda_c$ is the corresponding wave number to the central wavelength of the incident light, wherein $\mu$ is grooves per unit of the diffractive optical element, and wherein $K_1$, $K_2$, $K_3$, $L_1$, $L_2$, $L_3$ are material parameters of the prism.

7. The linear frequency domain grating of claim 6, wherein the grooves per unit $\mu$ of the diffractive optical element, the base angle $\alpha$, and the material parameters $K_1$, $K_2$, $K_3$, $L_1$, $L_2$, $L_3$ of the prism are selected such that the derivative $\theta_4'(k)$, when projected onto the focal plane in the output optical path, is a constant.

8. A multiband spectrometer, comprising at least one linear frequency domain grating of claim 1.

9. A multiband spectrometer, comprising:
a single mode fiber, a collimating unit, a grating, a focusing unit, and a camera array optically coupled to one another,
wherein, in operation, a beam of incident light is delivered by the single mode fiber to the collimating unit that collimates the delivered incident light into parallel light; the collimated parallel light is incident on the grating at a preset angle and output from the grating in a spectrum of light to the focusing unit that focuses the spectrum of light on the camera array that is positioned on a focal plane; and the camera array acquires the spectrum of light in real time;
wherein the collimation unit is rotatable;
wherein the grating is a linear frequency domain grating, comprising a dispersive optical clement and a diffractive optical element being substantially in contact with the dispersive optical element or being substantially integrated with the dispersive optical element, configured to receive a beam of incident light along an incident optical path, and diffract and disperse it into its constituent spectrum of frequencies of the light that is output from the dispersive optical element along an output optical path, such that the output light has a spatial distribution on a focal plane in the output optical path that is a linear function of the frequency; and
wherein the diffractive optical element is characterized with grooves per unit $\mu$, wherein the dispersive optical element is characterized with a refractive index $n(\lambda)$ a geometry and a size; and wherein the grooves per unit $\mu$ of the diffractive optical element, and the refractive index $n(\lambda)$, the geometry and the size of the dispersive optical element are selected such that the spatial distribution of the output light on the focal plane in the output optical path is a linear function of the wave number $k=2\pi/\lambda$, $\lambda$ being a wavelength of the incident light.

10. The multiband spectrometer of claim 9, wherein the camera array is a linear camera array.

11. The multiband spectrometer of claim 9, further comprising at least one of a first reflective mirror and a second reflective mirror.

12. The multiband spectrometer of claim 11, wherein the first reflective mirror is positioned between the grating and the focusing unit such that the spectrum of light output from the grating is reflected by the first reflective mirror to the focusing unit.

13. The multiband spectrometer of claim 11, wherein the second reflective mirror is positioned such that the spectrum of light focused by the focusing unit is reflected by the second reflective mirror to the camera array.

14. The multiband spectrometer of claim 9, wherein the linear frequency domain grating further comprises a protective optical element formed on the diffractive optical element such that the diffractive optical element is positioned between the protective optical element and the dispersive optical element.

15. The multiband spectrometer of claim 9, wherein the linear frequency domain grating a transmissive-type grating when the incident optical path and the output optical path are in different sides of the diffractive optical element, or a reflective-type grating when the incident optical path and the output optical path are in the same side of the diffractive optical element.

16. The multiband spectrometer of claim 9, wherein the diffractive optical element comprises a grating, and wherein the dispersive optical element comprises a prism.

17. The multiband spectrometer of claim 16, wherein the prism is a glass prism with a base angle $\alpha$, and wherein a differential $\delta\theta_4$ of an output angle $\theta_4$ of the output light with respect to a wave number $k=2\pi/\lambda$, $\lambda$ being a wavelength of the incident light, satisfies with the relationship of:

$$\delta\theta_4 = \left\{\frac{kX}{4\pi^2\sqrt{n(\lambda)^2 - \sin\theta_3^2}} + \frac{2\pi\mu Z\cos\theta_3}{Uk^2} + \frac{kXZ\cos\theta_3\cos\alpha}{4\pi^2 Y\sqrt{1 - n(\lambda)^2\cos\alpha^2}}\right\}$$

$$\frac{1}{V} \cdot \delta k$$
$$= \theta'_4(k) \cdot \delta k,$$

wherein $\theta_4'(k)$ is the derivative of the output angle $\theta_4$ with respect to the wave number k of the incident light, wherein $\theta_3$ is a diffracted angle of the incident light after it is diffracted by the diffractive optical element, and wherein n(λ) is a refractive index of the prism, and wherein $$\theta_3 = \sin^{-1}(\mu\lambda - \mu\lambda_c/2) - \sin^{-1}(\mu\lambda_c/2) + \sin^{-1}(n(\lambda)\cos\alpha)$$

$$n(\lambda) = \sqrt{1 + \lambda^2\left(\frac{K_1}{\lambda^2 - L_1} + \frac{K_2}{\lambda^2 - L_2} + \frac{K_3}{\lambda^2 - L_3}\right)},$$

$$U = \sqrt{1 - 4\pi^2\mu^2\left(\frac{1}{k} - \frac{1}{2k_c}\right)^2},$$

$$V = \sqrt{\frac{1}{\sin(2\alpha)^2} - \left[\sqrt{n(\lambda)^2 - \sin\theta_3^2} + \sin\theta_3\cot(2\alpha)\right]^2},$$

$$X = \frac{K_1 L_1}{\left(1 - \frac{L_1}{4\pi^2}k^2\right)^2} + \frac{K_2 L_2}{\left(1 - \frac{L_2}{4\pi^2}k^2\right)^2} + \frac{K_3 L_3}{\left(1 - \frac{L_3}{4\pi^2}k^2\right)^2},$$

$$Y = \sqrt{1 + \frac{K_1}{1 - \frac{L_1}{4\pi^2}k^2} + \frac{K_2}{1 - \frac{L_2}{4\pi^2}k^2} + \frac{K_3}{1 - \frac{L_3}{4\pi^2}k^2}}, \text{ and}$$

$$Z = \cot 2\alpha - \frac{\sin\theta_3}{\sqrt{n(\lambda)^2 - \sin\theta_3^2}},$$

wherein $\lambda_c$ is a central wavelength of the incident light, and $k_c = 2\pi/\lambda_c$ is the corresponding wave number to the central wavelength of the incident light, wherein μ is grooves per unit of the diffractive optical element, and wherein $k_1$, $K_2$, $K_3$, $L_1$, $L_2$, $L_3$ are material parameters of the prism, and wherein the grooves per unit μ of the diffractive optical element, the base angle a and the material parameters $K_1$, $K_2$, $K_3$, $L_1$, $L_2$, $L_3$ of the prism are selected such that the derivative $\theta'_4(k)$, when projected onto the focal plane in the output optical path, is a constant.

* * * * *